United States Patent [19]

Szepesvary

[11] 3,924,861
[45] Dec. 9, 1975

[54] RADIAL SHAFT PACKING RING
[76] Inventor: Jenö Szepesvary, Brockesstr. 3, 8 Munich 83, Germany
[22] Filed: Mar. 13, 1974
[21] Appl. No.: 450,729

[30] Foreign Application Priority Data
Mar. 13, 1973 Germany............................ 2312548

[52] U.S. Cl. .............................................. 277/185
[51] Int. Cl.² .......................................... F16J 15/32
[58] Field of Search ........................... 277/181–186, 277/189

[56] References Cited
UNITED STATES PATENTS
2,310,405  2/1943  Dodge................................. 277/185
2,819,106  1/1958  Voorhees............................ 277/182

Primary Examiner—Robert I. Smith
Attorney, Agent, or Firm—Edmund M. Jaskiewicz

[57] ABSTRACT

A radial shaft packing ring comprises two holding rings between which a sealing element is clamped and the rings are firmly connected to each other. The sealing element is provided with such a structure that it simultaneously seals the packing ring with respect to the bore and with respect to the shaft passing through the bore. One holding ring has an annular recess or plurality of annularly arranged recesses wherein the second ring has projections and raised portions corresponding in shape and position to the recesses. The sealing element likewise has openings to permit the passage of the projections therethrough.

7 Claims, 9 Drawing Figures

RADIAL SHAFT PACKING RING

The present invention relates to a radial shaft packing ring, more particularly, to such a packing ring including a sealing element clamped between two holding rings with all of the components being made of plastic.

Various forms of radial packing rings have been proposed. Such packings are generally formed of a plastic material such as rubber or rubber reinforced with a metal insert or ring. These known packing rings are generally produced as a single element through a vulcanization process. The radial pressure required to be exerted by the packing in order to seal is provided by a spring positioned against the sealing lips of the packing and urging the lips into sealing relation with the shaft and/or bore. Such a packing has the disadvantage that very little space remains for location of such a spring when there are only very small differences in the dimensions between the inner and outer diameters of the packing ring.

Another disadvantage is the likelihood of corrosion produced by the metal insert and the spring which is also made of metal. Further, the sealing element itself of the packing cannot be replaced and as a result a large number of packing assemblies must be maintained. Thus a large sum of money must be invested in such an inventory in order to insure the availability of the proper packing when necessary.

It is therefore the principal object of the present invention to provide a novel and improved radial packing ring.

It is another object of the present invention to provide a radial shaft packing ring made of plastic and which can be readily mass produced.

It is a further object of the present invention to provide a radial shaft packing ring wherein the sealing element itself can be replaced and the above stated disadvantages of known radial shaft packing rings are eliminated.

According to one aspect of the present invention a radial packing ring for a shaft may comprise a sealing element which has means thereon for sealing simultaneously the packing ring with respect to a bore into which it is inserted and with respect to a shaft passing through the bore. The first and second holding rings clamp the sealing element therebetween and are connected together in a suitable manner such as bayonet catch fastener means, ultrasonic welding, rivets or adhesives.

Other objects and advantages of the present invention will be apparent upon reference to the accompanying description when taken in conjunction with the following drawings, which are exemplary, wherein.

Proceeding next to the drawings wherein like reference symbols indicate the same parts throughout the various views a specific embodiment and modifications of the present invention will be described in detail.

Figure 1:
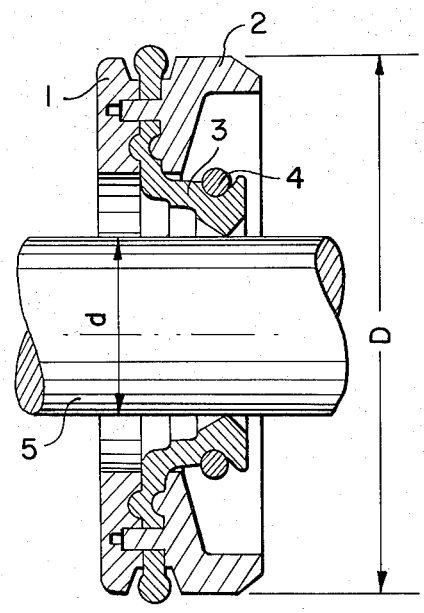
FIG. 1 is a longitudinal sectional view through a radial shaft packing ring according to the present invention.
Figure 2:
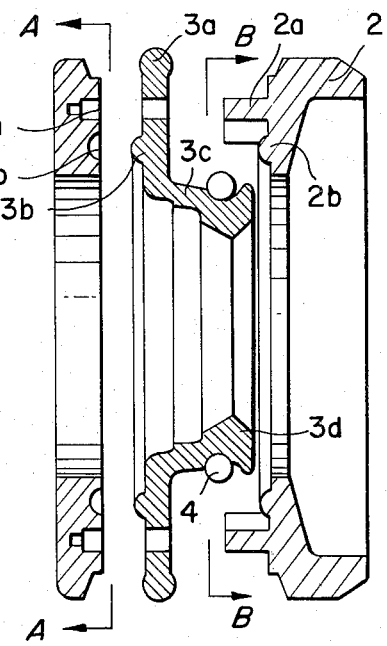
FIG. 2 is an exploded view of the packing ring shown in FIG. 1.
Figure 3:
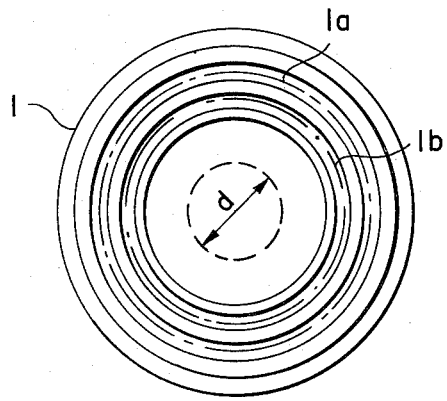
FIG. 3 is a plan view of one holding ring in the direction A—A of FIG. 2.
Figure 4:
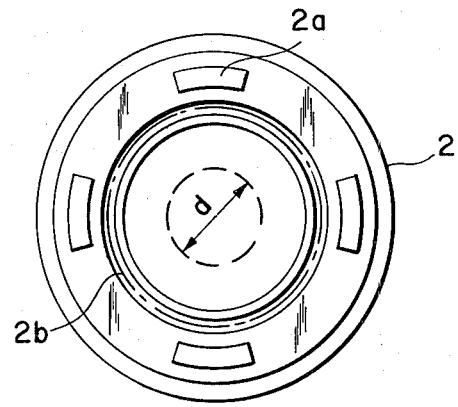
FIG. 4 is a plan view of the other holding ring viewed in the direction B—B of FIG. 2.
Figure 5:
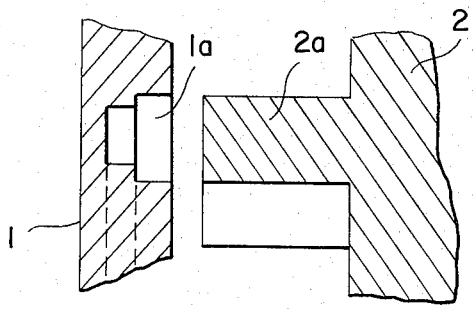
FIG. 5 is a portion of the view of FIG. 1 but with the sealing element omitted and in enlarged scale.

With particular reference to FIG. 1–5, the radial shaft packing ring of the present invention comprises a pair of holding rings 1 and 2. Holding ring 1 is provided with an annular recess or a plurality of annular recesses 1a and 1b. Holding ring 2 is provided with raised portions 2a and 2b that are shaped and positioned to engage the recesses on ring 1. The raised portions 2a, 2b are arcuate in shape and annularly arranged such as portions 2a shown in FIG. 4 or they may be in the form of rings such as raised portion 2b also shown in FIG. 4. Similarly, the recesses of ring 1 may be annular or concentric in shape or may comprise a number of annularly arranged arcuately shaped recesses to receive the corresponding raised portions on ring 2.

A packing element 3 is clamped between holding rings 1 and 2 and on its outer periphery is provided with a bulging or bulbous shape 3a which is sealingly engageable with the surface of the bore to seal in the packing ring with respect to the bore. A concentric annular raised portion 3b is also provided on the sealing ring corresponding in location to the annular recess 1b. A substantially tubular or conical diaphram surface 3c extends from an inner peripheral portion of the sealing element and is provided with a sealing lip or edge 3d which is engageable with the shaft passing through the bore. A clamping spring 4 encircles the diaphram surface 3c outwardly of the sealing lip 3d to maintain the sealing lip in sealing engagement with the shaft.

A sealing element 3 is provided with correspondingly located openings through which pass projections 2a so as to be received in recesses 1a of the holding ring 1. The annular convex portion 2b of ring 2 presses the projection 3b of the sealing element into recess 1b of holding ring 1. The holding rings 1 and 2 are connected to each other in a suitable manner such as by ultrasonic welding. The sealing of the packing ring with respect to the bore is accomplished by the peripheral portion 3a of sealing element 3 which is suitable to compensate for possible shrinkage in the synthetic plastic material from which the holding rings 1 and 2 are formed. The bulbous shape of the outer periphery 3a of the sealing element provides for a firm reliable seal in the bore in which the packing ring is positioned even where the holding rings are formed of thermoplastic or thermosetting plastic material which may shrink somewhat in the course of time because of the cold flow characteristics for plastic materials or the so-called plastic flow or creep thereof.

Figure 6:
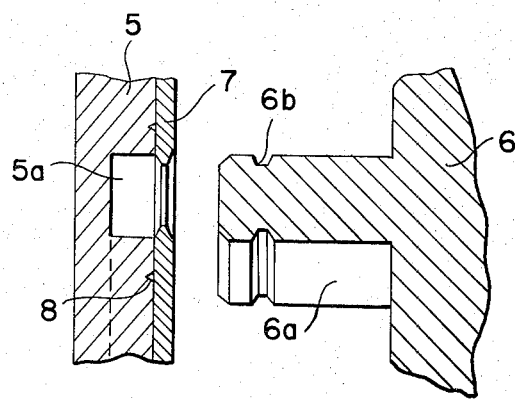
FIG. 6 is a view similar to that of FIG. 5 but showing a modification thereof.

In the modification of FIG. 6, there are shown holding rings 5 and 6 with a further ring 7 being attached to the inner face of holding ring 5. The ring 7 is provided with openings located to correspond with the recesses 5a of holding ring 5. The openings in ring 7 are of the same size or slightly smaller than the recesses of 5a. As a result, this modification provides for a snap closure or fastening of ring 6 which is provided with one or more projection 6a in each of which is formed a groove 6b.

The groove 6b will lock into the edges of the hole of ring 7 during the clamping together of holding rings 5 and 6 while the end of projection 6a is inserted into recess 5a of holding ring 5. Rings 5 and 7 may also be connected together through ultrasonic welding.

Figure 7:
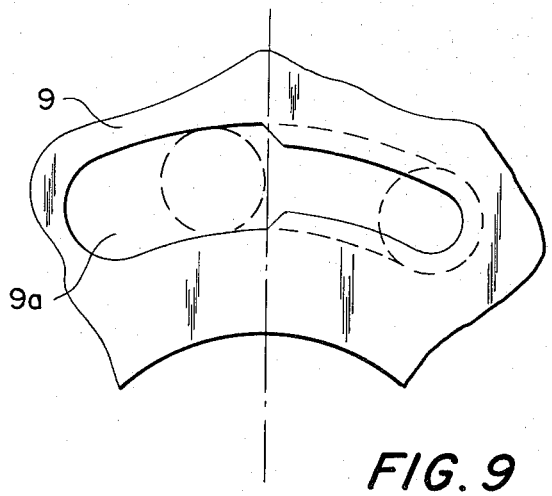
FIG. 7 is a plan view of a portion of the holding ring in FIG. 6.
Figure 8:
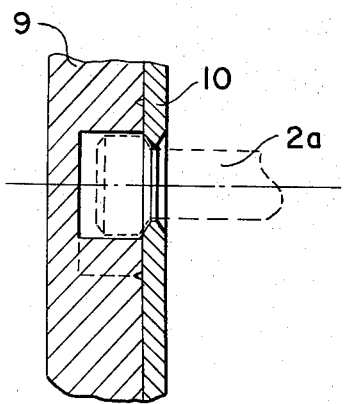
FIG. 8 shows a portion of the left hand holding ring of FIG. 6 and showing in phantom lines the projecting portion of the other holding ring retained therein.

In FIG. 7 there is a further modification wherein a bayonet catch is provided between the two holding rings. Similar to the modification of FIG. 6, holding ring 9 having recess 9a has attached thereto a ring 10 provided with a slotted opening which has portions of two different widths. The projections 2a of ring 2 are inserted into the wider portion of the slot and the bayonet catch coupling is made effective by rotating the two rings against each other so that the enlarged head on the end of projection 2a is secured behind the smaller portion of the slot and ring 10 as shown by the dash lines in the extreme right position of FIG. 7.

Figure 9:
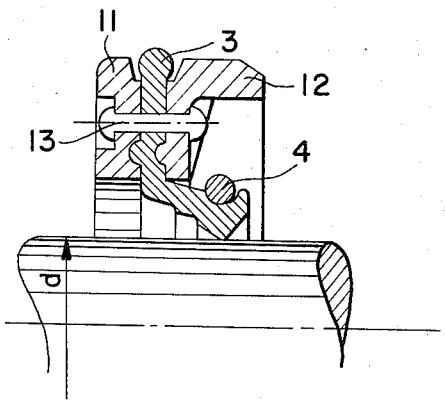
FIG. 9 is a half longitudinal sectional view of a further modification of the present invention.

In the modification of FIG. 9, holding rings 11 and 12 are provided but they do not have extensions or recesses. Instead, a plurality of annularly positioned bores are formed in the rings 11 and 12 through which rivets 13 are passed in order to connect firmly together the rings 11 and 12 to clamp the sealing element 3 therebetween.

The components of the packing ring are manufactured individually and the holding rings and sealing element may be formed by extrusion casting. The assembly of the packing ring is based on the building block or module principle wherein packing elements of different inner diameters can be inserted into holding rings of a particular outer diameter in order to provide the possibility of forming packing rings a various combinations of inner and outer diameters. The two clamping rings may be connected together by ultrasonic welding or by rivets or bolts. Also, the bayonet catch coupling may be used or various snap fasteners or adhesive bonds may also be employed.

It is therefore apparent that the present packing ring can be readily manufactured by mass production methods which is not possible with previously known packing rings. Further, the forming of this packing ring from a synthetic plastic material eliminates the disadvantages of metal/rivet combinations such as the possibilities of corrosion and also significantly reduces the cost of the step in the manufacturing process involving working of the metal reinforcing ring. Savings are made by eliminating the loss of sheet metal resulting from punching of the ring and the loss of time required to assemble the metal reinforcing rings into the rubber pressing or extrusion casting machines. Further, manufacturing experience shows that there has been a high rate of rejection for such metal/rubber combinations. As described above, an advantage of the present ring, is that various combinations of the inner and outer diameters of the packing ring assembly may be quickly and accurately obtained.

It will be understood that this invention is susceptible to modification in order to adapt it to different usages and conditions, and accordingly, it is desired to comprehend such modifications within this invention as may fall with the scope of the appended claims.

What is claimed is:

1. A radial packing ring for a shaft comprising a sealing element, said sealing element having a bulbous peripheral edge engageable with a bore into which the packing ring is inserted and an inner peripheral lip engageable with a shaft passing through the bore so that the packing ring is sealed simultaneously with respect to a bore into which it is inserted and with respect to a shaft passing through the bore, and first and second rings clamping said sealing element therebetween and connected together.

2. A radial packing ring as claimed in claim 1 wherein one of said rings has annular recess means thereon, and the other of said rings having annular projection means engageable with said recess means to mate therewith when clamping said sealing element therebetween.

3. A radial packing ring as claimed in claim 2 wherein said annular projection means comprises a plurality of annularly arranged projections.

4. A radial packing ring as claimed in claim 2 wherein said sealing element has a concentric projection engageable with annular recess means on said one ring.

5. A radial packing ring as claimed in claim 2 wherein there are slots in said sealing element corresponding to the positions of said annular projection means.

6. A radial packing ring as claimed in claim 2 and comprising a third ring on the inner surface of said one ring having the annular recess means thereon, said third ring having an opening therein corresponding to the position of said annular recess means, said opening having a size no greater than said recess.

7. A radial packing ring as claimed in claim 1 and bayonet catch means connecting said first and second rings.

* * * * *